United States Patent Office 3,244,563
Patented Apr. 5, 1966

3,244,563
METHOD FOR PRODUCING LEAD OXIDE
Frederick M. Coppersmith, Queens Village, and George J. Vahrenkamp, Flushing, N.Y., assignors to National Lead Company, New York, N.Y., a corporation of New Jersey
Original application Feb. 16, 1961, Ser. No. 89,735. Divided and this application Nov. 5, 1962, Ser. No. 235,316
4 Claims. (Cl. 136—27)

This application is a division of our copending application, Serial No. 89,735, filled February 16, 1961.

This invention relates to an improved process and apparatus for manufacturing a new composition of finely-divided lead oxides and lead which is particularly suitable for manufacturing the plates used in lead storage batteries, including those batteries known as the S.L.I. type (starting, lighting and ignition).

Lead oxide-lead mixtures used in the making of the plates for lead storage batteries have been manufactured for many years by two different processes. One such product has been made by an attrition procedure in which solid pieces or chunks or metallic lead are tumbled in a ball mill or drum through which a stream or air flows. In the attrition process, lead oxide formed as a skin on the chunks of solid metal is knocked off by the tumbling action, together with small flakes of metallic lead, and the product is removed from the ball mill or drum either by overflowing at the outlet, or by being carried away in the air stream.

The product of the attrition process is a mixture containing usually about 15 to 30% by weight of thin metallic lead particles, with the balance composed of even smaller particles of litharge (PbO) almost entirely in the tetragonal crystal form. One of the recognized disadvantages of this product for manufacturing the plates used in lead storage batteries is that it is not feasible to produce a product in which the metallic lead content is substantially above about 30% by weight of the total product and yet provide a satisfactory battery lead oxide-lead product. In products produced by the attrition process containing more than about 30% by weight of metallic lead, the metallic lead particles are of too large a particle size to properly hydroset in producing lead storage battery plates by conventional practices.

The other general type of product used for making battery plates is produced by the oxide pot or Barton pot operation, in which molten lead is fed into a pot and vigorously agitated by a stirrer while a stream of air passes through the pot and carries off the desired product through an uptake into a settling chamber. In this process, the pots are operated at temperatures well above the melting point of lead (621° F.) and the particles of both lead oxides and metallic lead are more or less round in shape, and not flat. Here again, the product usually varies in composition from around 15 to 30 or 35% metallic lead, with the balance consisting of a mixture of the two different crystal forms of litharge (PbO), tetragonal and orthorhombic. At contents of above about 35% by weight of metallic lead the product is unsatisfactory for the manufacture of battery plates by conventional procedures because it does not hydroset properly. By controlling the rate of air flow and the average temperature of the pot operation as described in Mayer Patent No. 2,235,487, it has been possible heretofore to obtain a product reasonably uniform with respect to the percentage of metallic lead and the relative proportions of tetragonal litharge and orthorhombic litharge. The particles of free metallic lead in the Barton oxide product are not only different in shape, being more or less round in shape, but usually average somewhat smaller in size (about 15 to 20 microns on the average) than the flat metallic lead particles in the ball mill product.

Efforts have been made heretofore by grinding and other techniques to make such products with particles of even smaller sizes, but they have only been successful in reducing the size of the lead oxide particles. The metallic lead particles are so malleable by their nature that grinding or the like merely changes their shape without substantially reducing their diameter on the average. As a consequence, the best Barton oxide products, even after milling, have contained oxide particles averaging 2 to 4 microns in diameter, while the metallic lead particles averaged 15 to 20 microns in diameter. The ball mill products contain even larger particles of metallic lead.

One object of this invention is to provide a novel process for manufacturing a new lead oxide-lead product which has many advantages over either of the foregoing when used in making plates for lead storage batteries. Another object of this invention is to provide a novel process for manufacturing a Barton pot type of oxide product in which the particles of metallic lead are not in the usual shape, but are flat platelets of only about 1 to 1.5 microns in thickness rather than more or less jagged irregular particles as have been obtained by prior art Barton oxide processes.

A further object is to provide a process for producing an improved lead oxide product which contains a substantially larger number of particles per unit of weight than the prior products produced by the Barton oxide process.

Still another object of this invention is a provision of improvements in the Barton oxide apparatus and process which make it possible to produce the foregoing new product.

Certain more or less empirical tests have been employed for judging the quality of a lead oxide-lead product used for making lead storage battery plates. Two of the most frequently used tests for this purpose are the apparent density test and the acid absorption test. The apparent density is determined by filling a one-inch cubical measuring cup with the product under a specified procedure and weighing the contents. Apparent densities of 22 to 28 or 29 grams per cubic inch have been considered acceptable in the past for Barton oxide products. Barton oxide products prepared according to this invention can be readily made having an apparent density in the order of 18 to 22 grams per cubic inch.

The acid absorption of the material is determined by a standard but empirical procedure in which a weighed amount of the product is treated with sulphuric acid, and the amount of the acid absorbed in a certain time is determined. Acid absorptions of 140 to 160 (in terms of milligrams of $H_2SO_4$ absorbed by one gram of oxide product) have been considered very acceptable in the past for Barton oxide products, whereas the products of this invention can be readily made with acid absorptions above about 180, preferably from about 200 to 220.

In the manufacture of plates for lead storage batteries, the oxide-lead product is first made into a paste with the addition of water and usually as an additional liquid, sulphuric acid. This paste is then pressed onto an open work cast grid and dried to form the plate in a process known as hydrosetting. During the drying of the paste, the finely-divided metallic lead should be largely or completely converted to lead oxide with spontaneous generation of heat. It is generally recognized that it is desirable, particularly in making the positive plates, to have no substantial residue of metallic lead in the dried paste upon completion of the drying operation. In using the product of this invention to make battery plates, the paste can be made with a material that is relatively high in free metallic lead without leaving any undesired residue of unoxidized metal upon drying. Additionally, the higher concentration of metallic lead produces a greater quantity of exothermic heat, thereby accelerating the hydrosetting operation. Also, we have found that battery plates can be made from our new oxide product using about 10 to 20% less paste or weight of solid product per plate than heretofore considered necessary and still produce a storage battery that meets all of the required discharge, voltage, life and other tests established as standard for storage batteries by the Society of Automotive Engineers.

The process and apparatus of the invention will be better understood by referring to one suitable form of apparatus shown in the accompanying drawings in which.

Figure 1:
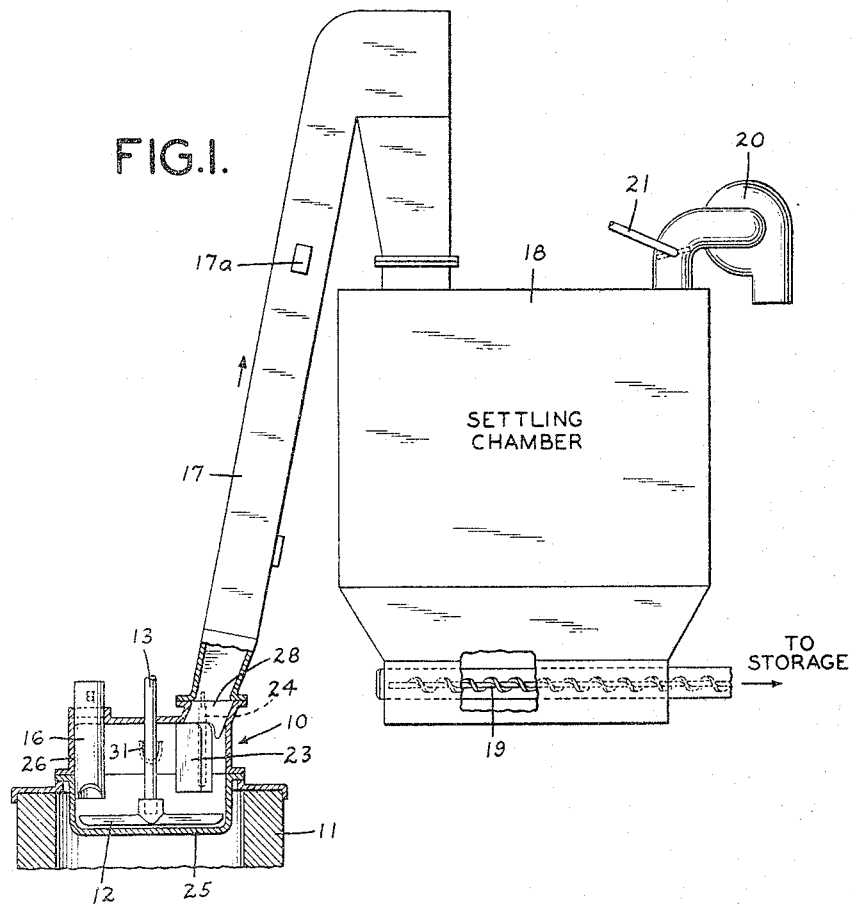
FIG. 1 is a side elevational view partly in section of a Barton pot, uptake, settling chamber, and associated parts modified so as to be suitable for making the new product of this invention.
Figure 2:
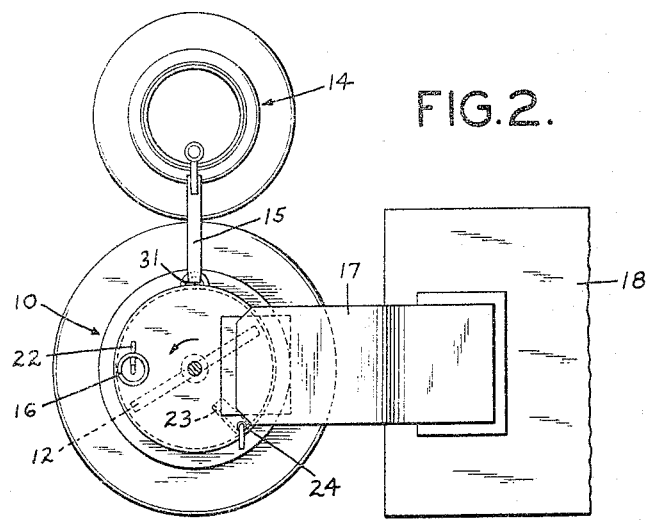
FIG. 2 is a plan view of the modified Barton pot, an associated melting pot, the uptake and part of the settling chamber as shown in FIG. 1.

Referring to the drawings, and particularly FIGS. 1 and 2, the apparatus of this invention is similar to that shown in Mayer Patent 2,235,487 but has been modified in various respects which we have found desirable for producing our new oxide material. For example, the apparatus includes basically a Barton pot 10 mounted in suitable foundations 11 and provided with a rotary stirrer or agitator 12 carried on a vertical shaft 13. Lead is melted in a suitable melting pot 14 and a continuous stream of the molten lead is fed through a suitable feeding device 15 from the melting pot 14 into the Barton pot 10. The rate of flow of the molten lead may be controlled by the type of apparatus shown in said Mayer patent or by any other suitable valve arrangement capable of providing a continuous flow of molten lead at a controlled variable rate. Air flows into the Barton pot through an intake 16 and the product, consisting of a finely-divided mixture of lead oxides and metallic lead, is carried off through an uptake 17 to a settling chamber 18, where it falls to the bottom of the chamber and is removed to storage or further treatment by a screw conveyor 19 or other suitable means. Affixed to the uptake 17 is a vibrator 17a so as to prevent build-up of product in the uptake. The constant action of the vibrator provides steady return of a portion of the product which collects on the walls of the uptake to the Barton pot to provide a more constant supply of dross in the Barton pot. A stream of air through the Barton pot 10, the uptake 17 and settling chamber 18 is created by a suction fan 20 and the rate of flow of air is controlled by a suitable damper or valve 21. The rate of air flow can be measured at the intake 16 by means of the usual Pitot tube 22 and either recorded or used to vary the position of the damper 21 to maintain a constant draft by suitable mechanism (not shown).

Figure 3:
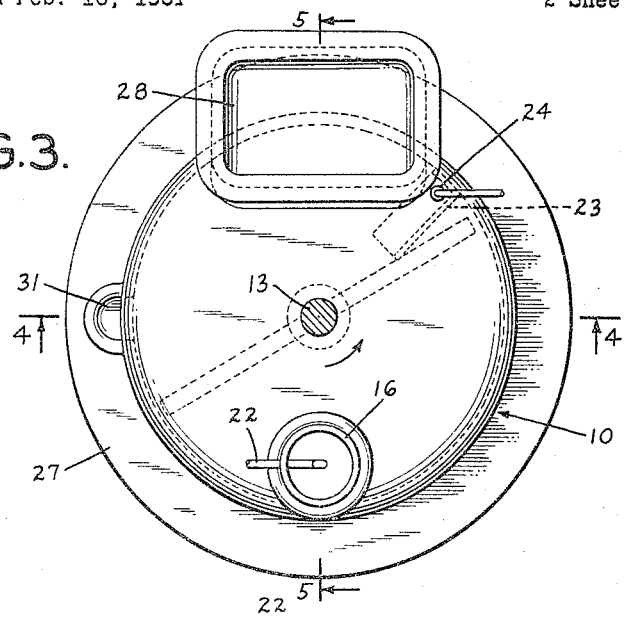
FIG. 3 is a plan view of a modified Barton pot shown on a larger scale than in FIG. 1.

A fixed radical baffle 23 is preferably positioned within the pot 10 so as to be on the side of the uptake farthest from the molten lead inlet when the stirrer is rotated in the direction of the arrows indicated in FIGS. 2 and 3. A suitable pyrometer or other temperature measuring device 24 may be located adjacent the baffle 23 in a position to be protected by it, and may be connected to a suitable temperature indicating or recording device (not shown).

Figure 4:
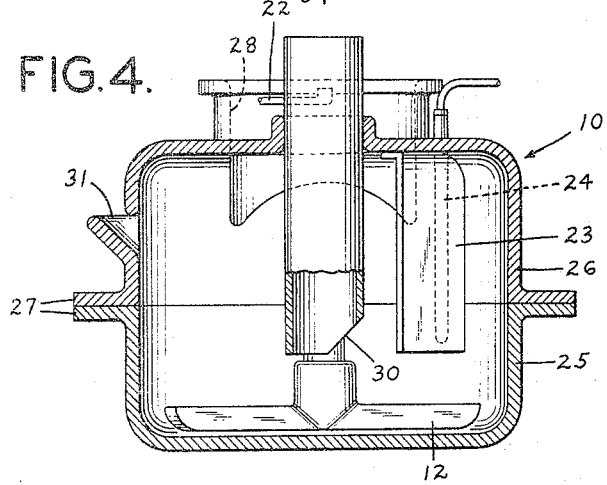
FIG. 4 is a vertical sectional view of this improved Barton pot taken generally on the line 4—4 of FIG. 3.
Figure 5:
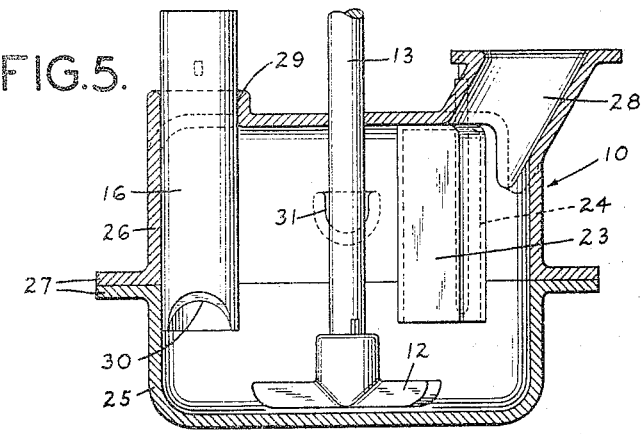
FIG. 5 is a vertical sectional view of the pot taken on the line 5—5 of FIG. 3.

Referring now more particularly to FIGS. 3, 4 and 5, the Barton pot proper can be made of the usual base section 25 and cover section 26 which are provided with suitable flanges 27, so that they can be bolted or otherwise attached together. The cover section 26 is provided on opposite sides with an outlet opening 28 to which the uptake 17 is attached and with an opening 29 through which the air inlet pipe 16 extends. The air inlet pipe differs from the usual Barton pot installation in that it extends down into the lower portion of the pot and introduces the air within a few inches above the top of the stirrer. This inlet pipe may be perforated or cut away at the bottom as at 30 on the side away from the motion of the stirrer. The cover section 26 of the pot is also provided with a spout or lip 31 through which the molten lead is introduced, this molten lead inlet being located about half way between the air inlet and the uptake. The radial baffle 23 is preferably positioned differently and made larger than usual so that it extends about half way into the center of the pot and also extends from the top down to a point approximately as far as the air inlet 16. The outlet opening 28 and the uptake 17 attached to it are preferably made much larger than usual in a cross section, and the uptake 17 is made much longer than is customary in Barton pot operations. We have found, for example, that a cross-sectional area of 800 square inches compared to the normal 400 square inches, combined with an uptake length of approximately 20 feet compared with the usual 6 to 8 feet, is preferable for operation in accordance with our invention. Such a construction provides better classification of particle sizes of the product. The less desirable larger sized particles are more likely to be returned to the Barton pot where they undergo further oxidation and grinding off of the oxide coating by the dross in the bottom of the pot to reduce particle size to that desired in accordance with the invention.

Since the air inlet pipe 16 extends down into the lower portion of the Barton pot it provides for greater cooling of the dross being agitated in the bottom of the pot and better utilization and circulation of air through the apparatus and better control of the temperature.

The larger size of the radial baffle 23 and its position before the uptake reduces the likelihood of large sized particles of material being swept up into the uptake. Therefore, only the smaller sized particles are likely to be removed from the Barton pot. This construction also helps to retain sufficient dross in the Barton pot to disperse the molten lead as it enters the pot into finely divided droplets before they freeze. The finely-divided lead particles in the frozen state will oxidize at a slower more uniform rate and provide a more desirable sized particle in the final product.

In the operation of this equipment the pot is started in the usual manner by heating it and running in a charge of molten lead. The heat under the pot is then turned off, the agitator or stirrer 12 is started rotating and the suction fan 20 is turned on. Thereafter it is usually not necessary to supply any heat to the system except for that provided by the exothermic reaction and the molten lead. Each time one arm of the stirrer 12 comes around, it throws the load of the pot violently against the baffle 23 which causes the material in the pot to be broken up into very fine particles. The flow of air from the inlet 16 through the pot and out the uptake 17 serves three different functions. It supplies the oxygen needed to oxidize metallic lead to lead oxide; it acts as a conveyor to carry the product out of the pot through the uptake 17 to the settling chamber; and it exerts a substantial cooling effect on the pot and its contents. The flow of air is usually adjusted by trial and error to produce a product of the desired percentage of free metallic lead, and thereafter it is varied only slightly during the course of operation.

Although the pot operation is started with molten lead, the mass of material in the pot is soon converted into a dross, which is a mixture of solid granular lead oxides and lead (both molten and solid) and which is violently agitated and periodically thrown up against the baffle by the stirrer. We have found that by using a suitable baffle just ahead of the uptake, introducing the air into the lowest portion of the pot, and using a greatly enlarged and lengthened uptake equipped with a vibrator, the operation of the pot can be controlled so as to produce a product with both metallic lead and lead oxide of very fine particle size and, at the same time, the operating temperature of the pot can be maintained low enough so that no more than 15% of the lead oxides in the product are in the form of the orthorhombic crystal modification. In the usual prior art Barton pot operation, the rotation of the stirrer is about 150 r.p.m. By increasing this speed of rotation, for example, to about 300 r.p.m. we have found that it is easier to produce the desired product of this invention at highly efficient rates.

An important feature of the process of the present invention is to maintain a leady oxide dross in the Barton pot during the process. It is possible to maintain the dross in the Barton pot by means of the particle size classification system provided by the operation of the uptake 17, whereby larger, over-sized particles are returned to the pot for further oxidation and size reduction and the desirable size particles are recovered in the settling chamber 18. When the molten lead feed is directed into the pot it is immediately finely dispersed in the leady oxide dross before it has had an opportunity to freeze. This assists in markedly reducing the particle sizes of the lead oxide particles, and also of the unoxidized metallic lead. By continuing a low rate of feeding the molten lead and increasing the rate of air flow, it is possible to operate the pot at temperatures below the melting point of lead (621° F.) ranging down, in some cases, to as low as 300° F. Preferred temperatures are between about 400° and 500° F. The discovery that the lead in the pot could be oxidized at highly efficient commercial rates wherein the pot content has an average temperature below the melting point of lead was surprising. We have discovered that maintaining the temperature below the melting point of lead is essential in producing a lead oxide-lead composition wherein the particles of both lead oxide and metallic lead in the final product are of very fine particle size and high metallic lead content, accompanied by a very high acid absorption value, low apparent density, and other properties which make the composition of the invention greatly superior to the lead-lead oxide products heretofore available for making lead storage battery plates. Maintenance of the contents of the Barton pot at an average temperature of below the melting point of lead constitutes an important feature of the present invention.

The process of the present invention permits economical production of a superior lead-lead oxide product. In accordance with the invention at high rates of production it is possible to feed the molten lead into the apparatus at rates of 1000 to 1500 pounds per hour in apparatus of the size described hereinabove.

In order more clearly to disclose the nature of the present invention, specific illustrative examples will be set forth. It should be understood, however, that this is done solely by way of example and is intended neither to delineate the scope of the invention nor limit the ambit of the appended claims. Parts are expressed in terms of parts by weight.

*Example 1*

Employing the apparatus and process described hereinabove in conjunction with the drawings and operating the stirrer at a rate of 300 r.p.m., maintaining the contents of the Barton pot at a temperature of 420°–440° F., introducing the molten lead into the pot at a rate of 1100–1150 pounds per hour, introducing air into the inlet tube at a pressure of 0.5 inch of water as measured by a Pitot tube with the air inlet having a diameter of 10 inches, a product was obtained containing 43.5% metallic lead, 10–12% orthorhombic lead oxide and the remainder tetragonal lead oxide. The product had an apparent density of 20.8 and an acid absorption value of 201. The metallic lead particles had an average thickness of 1–1.5 microns. This lead-lead oxide product possessed excellent properties for producing lead storage batteries.

It would not have been possible to produce compositions having the high percentage of metallic lead and the thinness of less than 1.5 microns of the metallic lead particles obtained in the foregoing example by employing the prior art Barton oxide process or the ball mill process.

*Example 2*

Employing the apparatus and process described hereinabove in conjunction with the drawings and operating the stirrer at a rate of 300 r.p.m., maintaining the contents of the Barton pot at a temperature of about 480° F., introducing the molten lead into the pot at a rate of about 1173 pounds per hour, introducing air into the inlet tube at a pressure of 0.6 inch of water as measured by a Pitot tube with the air inlet having a diameter of 10 inches, a product was obtained containing 48.5% metallic lead, 10–12% orthohombic lead oxide and the remainder tetragonal lead oxide. The product had an apparent density of 22.1 and an acid absorption value of 205. The metallic lead particles had an average thickness of 1–1.5 microns. This lead-lead oxide product possessed excellent properties for producing lead storage batteries.

The novel lead-lead oxide products produced in accordance with the process of the invention have unique properties which are greatly superior to the products heretofore available for making lead storage battery plates. The products of the invention have an acid absorption value of at least about 180, apparent densities of about 18–22, a content of metallic lead of at least about 38% by weight, up to about 60%, and preferably between about 40 and 50% by weight of product, an average thickness of metallic lead particles of between about 1 and 1.5 microns, anorthorhombic lead oxide content of between about 5 and 15%, lead oxide particles of average particle size of less than one micron, with the number of particles per cc. of product being between about 1.8 and $2.2 \times 10^{12}$, when measured by microscopical methods for particle size distribution of particulate substances of subsieve sizes according to A.S.T.M. Method E20–51T, issued 1933 and revised in 1948 and 1951.

The products of the invention also have a cube weight of 56.5–58 when converted to a paste prepared by mixing one pound of product with 40 cc. of 1.4 specific gravity sulphuric acid and sufficient water to give a consistency value of 10 when measured in accordance with test procedures well known to the art.

The unique nature of the properties of the products produced in accordance with the process of the present invention is brought out by a comparison with the values obtained for typical products made by prior art Barton oxide procedures and by the ball mill process. This is shown in Table 1 below:

TABLE I

| Property | Products of the process of the present invention | Typical Barton oxide products of the prior art | Typical Ball mill products of the prior art |
| --- | --- | --- | --- |
| Acid absorption | Above about 180 | 140-160 | 250-275. |
| Apparent density | 18-22 | 22-29 | 18.5-20.5. |
| Average particle size of lead oxide particles. | Less than 1 micron | 2.7-3.0 microns | Less than 1 micron. |
| Percent by weight of metallic lead. | At least about 33% | 15-35% | 15-35%. |
| Average thickness of metallic lead particles. | 1-1.5 microns | Jagged particles of varying thickness. | 1-1.5 microns. |
| Percent by weight of orthorhombic lead oxide. | 5-15% | 5-15% | Less than 1%. |
| Cube weight of paste | 56.5-58 | 65-66 | 61.5-63.5. |
| Number of particles per cc | 1.8 to $2.2 \times 10^{12}$ | 0.25 to $0.40 \times 10^{12}$ | 1.2 to $1.6 \times 10^{12}$. |

The lead-lead oxide products produced in accordance with the present invention are unique in that they permit a saving of 10 to 20% in the amount of product which need be employed to produce a battery plate and yet meet the standard S.A.E. tests for storage battery plates. Expressed in another way, the lead-lead oxide products of the invention provide a 10 to 20% increase in capacity per unit amount of lead oxide product over the comparable battery lead oxide products of the prior art. This increase in capacity is achieved without loss in other properties which are necessary in commercial lead storage battery plates. This saving is even more significant when one considers that approximately 200,000 tons of lead oxide product are employed annually in the production of lead storage battery plates.

Another unique characteristic of the products produced in accordance with the invention is that they absorb more water and sulphuric acid than do the conventional prior art lead oxide products and still produce a paste satisfactory for the production of battery plates. This, in part, explains why the battery manufacturer may employ less lead oxide product in producing the pastes which are applied to the grids in producing battery plates.

Another important advantage of the products produced in accordance with the invention, which we believe results from their higher metallic lead content, is that they produce a greater amount of heat during the hydrosetting process and thereby provide greater binding power of the paste to the grid and expansion of the paste during drying. This in turn provides a more porous coating, having more surface area, and this in turn may account in part for the higher capacity or efficiency in battery plates produced from the lead-lead oxide products in accordance with the present invention.

Some of the advantages of the lead-lead oxide products produced in accordance with the present invention over a standard commercial product of the prior art produced by the Barton oxide process will be described below, employing the product of the invention produced in accordance with Example 1 hereinabove.

In conducting the test a determination is first made of the amount of 1.4 specific gravity sulphuric acid and water which both lead oxide products will absorb to produce a paste of a consistency value of 10 units when determined by the standard procedure employed in the art. In Table II below are compared the amounts employed and the resulting cube weights.

TABLE II

|  | Product of Example 1 | Commercial prior art Barton oxide product |
| --- | --- | --- |
| Amount of water (cc.'s per lb. of product) | 90 | 60 |
| Amount of sulphuric acid (cc.'s per lb. of product) | 40 | 40 |
| Cube weight (weight of a cubic inch of paste having a consistency value of 10 units) | 58 | 66 |

The results shown in the foregoing table demonstrate the ability of the products produced in accordance with the invention to absorb substantially larger amounts of water and sulphuric acid than prior art products and yet obtain the desired consistency value of about 10 units. The data also demonstrate the ability to produce lower cube weights at the same consistency value.

In conducting actual battery tests using the product of Example 1 and comparing that product with the same commercially available Barton oxide product, positive and negative plates were made of pastes of the following compositions:

Positive paste 50 pounds of the product of Example 1, 92 cc. of water per pound of product of Example 1, 40 cc. of 1.4 specific gravity sulphuric acid per pound of product of Example 1, were blended to produce a paste having a consistency of 9 units and a cube weight of 57.5.

Negative paste 49 pounds of the product of Example 1, 1 pound of standard negative battery plate expander, 70 cc. of water per pound of product of Example 1, 29 cc. of 1.4 specific gravity sulphuric acid per pound of product of Example 1, were blended to provide a paste having a consistency of 10 units and a cube weight of 65.

From the positive and negative plate pastes described above, battery plates were produced in accordance with standard commercial production practices and cells produced each containing 7 positive and 8 negative plates. Listed below in Table III is the amount of dry weight of lead oxide product applied as a coating to each plate grid. In cells 11 and 12 there was employed a paste produced from the same commercially available prior art Barton oxide product employed in Table I.

TABLE III

|  |  | Oz./plate |  | Oz./plate |
| --- | --- | --- | --- | --- |
| Cells 1 and 2 | Positives | 3.33 | Negatives | 3.18 |
| Cells 3 and 4 | do | 3.53 | do | 3.18 |
| Cells 5 and 6 | do | 3.45 | do | 3.26 |
| Cells 7 and 8 | do | 3.53 | do | 3.38 |
| Cells 9 and 10 | do | 3.33 | do | 3.33 |
| Cells 11 and 12 | Control | 3.86 | Control | 8.75 |

The cells were then subjected to efficiency tests to determine the efficiency of the cells at a discharge rate of 5 amps. over a 20-hour period and to the standard cold test at 0° F. The results in Table IV below tabulate the average obtained for each set of two cells at a 5-ampere discharge rate in terms of ampere hours at the 20-hour rate. The cold test measures the number of minutes for the cell to discharge at a discharge rate of 300 amps. at 0° F.

TABLE IV

|  | 20 Hours at 5.0 amperes, A. Hrs. | Cold test 300 amperes at 0° F., minutes |
|---|---|---|
| Average of Cells 1 and 2 | 98.8 | 4.01 |
| Average of Cells 3 and 4 | 103.8 | 4.49 |
| Average of Cells 5 and 6 | 102.5 | 4.70 |
| Average of Cells 7 and 8 | 104.6 | 4.80 |
| Average of Cells 9 and 10 | 99.7 | 4.11 |
| Average of Cells 11 and 72 (Control) | 98.3 | 3.85 |

In Table V below is computed the efficiency of the plate in terms of ampere hours per ounce of dry weight of unformed positive plate active material per cell at the 20-hour rate.

TABLE V

*20-hour efficiency test*

|  | No. of Pos. Plates | Av. Weight, oz. | Total Weight, oz. | Ampere Hrs. Obtained | Ampere Hrs. per oz./dry positive plate material |
|---|---|---|---|---|---|
| Cells 1 and 2 | 7 | 3.33 | 23.31 | 98.8 | 4.24 |
| Cells 3 and 4 | 7 | 3.53 | 24.71 | 103.8 | 4.20 |
| Cells 5 and 6 | 7 | 3.45 | 24.15 | 102.5 | 4.24 |
| Cells 7 and 8 | 7 | 3.53 | 24.71 | 104.6 | 4.23 |
| Cells 9 and 10 | 7 | 3.33 | 23.31 | 99.7 | 4.28 |
| Cells 11 and 12 (Control) | 7 | 3.85 | 27.02 | 98.3 | 3.64 |

As shown from the foregoing Table V, when the average of the results obtained from cells 1 through 10 are compared with the control cells 11 and 12, the product of Example 1 is approximately 16.5% greater in capacity than the commercially available prior art Barton oxide composition.

When the battery plates prepared from the lead oxide product of Example 1 were subjected to the S.A.E. life test, cold test and other standard tests employed in evaluating lead storage batteries, they passed all of such tests.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:

1. In a process of operating a Barton type of oxide pot to make a battery oxide product, the steps of introducing a stream of air into the lower portion of the pot just above the stirrer therein, feeding molten lead into the pot in a continuous stream in a sufficiently small amount to maintain the contents of the pot at a temperature below the melting point of lead, vigorously agitating the pot contents by periodically dashing them against a large fixed baffle, carrying off the product from the pot through an elongated uptake and during the operation of said pot continuously maintaining a dross of particles of metallic lead and lead oxides in said pot in sufficient amount to provide a medium for dispersing the molten lead as it is introduced.

2. A process of operating a Barton type of oxide pot as defined by claim 1, wherein the contents of the pot are maintained at a temperature of between about 300 and 621° F.

3. A process of operating a Barton type of oxide pot as defined by claim 1, wherein the contents of the pot are maintained at a temperature of between about 400 and 500° F.

4. A process as defined by claim 1, wherein the dross is maintained in the pot by continuously returning to the pot a portion of the larger heavier particles which are carried into the elongated uptake.

References Cited by the Examiner

UNITED STATES PATENTS

| 846,444 | 3/1907 | Bailey | 23—146 |
| 1,770,777 | 7/1930 | Haynes | 23—279 |
| 1,913,391 | 6/1933 | Hutchinson | 23—146 |
| 2,235,487 | 3/1941 | Mayer | 23—146 |
| 2,380,096 | 7/1945 | Doan et al. | 136—26.1 |
| 2,383,220 | 8/1945 | Seabury et al. | 23—146 |

ALLEN B. CURTIS, *Primary Examiner.*

JOSEPH REBOLD, JOHN R. SPECK, JOHN H. MACK,
*Examiners.*